US006496810B1

(12) United States Patent
Pollard et al.

(10) Patent No.: US 6,496,810 B1
(45) Date of Patent: Dec. 17, 2002

(54) ULTRA-HEAVY MAIL PIECE PROCESSING SYSTEM

(75) Inventors: Larry C. Pollard, Highlands Ranch, CO (US); Kurtis A. Haufschild, Littleton, CO (US); Steven E. Cole, Belleview, NE (US)

(73) Assignee: Qwest Communications International, Inc., Denver, CO (US)

(*) Notice: Subject to any disclaimer, the term of this patent is extended or adjusted under 35 U.S.C. 154(b) by 0 days.

(21) Appl. No.: 09/447,701

(22) Filed: Nov. 23, 1999

(51) Int. Cl.[7] .............................................. G06F 17/60

(52) U.S. Cl. .......................... 705/407; 700/90; 700/99; 700/100; 705/401

(58) Field of Search ........................... 700/90, 99, 100; 705/7, 8, 9, 401, 407, 408, 410

(56) References Cited

U.S. PATENT DOCUMENTS

| | | | | | |
|---|---|---|---|---|---|
| 5,265,209 | A | * | 11/1993 | Kageyama et al. | 358/1.2 |
| 5,548,375 | A | * | 8/1996 | Mitsuya et al. | 399/9 |
| 5,628,249 | A | * | 5/1997 | Corery et al. | 101/91 |
| 5,684,706 | A | * | 11/1997 | Harman et al. | 700/95 |
| 5,745,590 | A | * | 4/1998 | Pollard | 382/101 |
| 5,873,073 | A | * | 2/1999 | Bresnan et al. | 705/410 |
| 5,893,129 | A | * | 4/1999 | Pollard | 707/522 |
| 6,049,775 | A | * | 4/2000 | Gertner et al. | 705/8 |
| 6,092,802 | A | * | 7/2000 | Lackner et al. | 271/225 |

FOREIGN PATENT DOCUMENTS

| | | | | |
|---|---|---|---|---|
| JP | 01-216873 | * | 8/1989 | 235/432 |
| JP | 02-297123 | * | 12/1990 | |
| JP | 08-166944 | * | 6/1996 | |

OTHER PUBLICATIONS

M2 Presswire: "OCE: Oce cuts cost of high–volume computer output printing", Jul. 1, 1998.*

* cited by examiner

*Primary Examiner*—Edward R. Cosimano
(74) *Attorney, Agent, or Firm*—Marsh, Fischmann & Breyfogle

(57) ABSTRACT

An ultra-heavy mail piece processing system first collects the data to be printed out and then formats the data for printing. A rendering process then determines how the mail piece will be printed. Based on the total number of pages in the mail piece, the system will direct mail pieces having a total number of pages equal to or greater than an upper bound to an ultra-heavy handling process. The data stream for each ultra-heavy mail piece is split into a data stream for the first page and a data stream for all the second pages for the mail piece. The data stream for each first page is sent to a printer for printing in one-up format. The data stream for each set of second pages is reformatted to allow the data stream for each set of second pages to be sent to and printed on a different printer from the first printer in a two-up format. After each of the first pages and each set of second pages are printed, the first pages are manually collated with their corresponding set of second pages, and each mail piece is then manually packaged up and the proper postage is applied for mailing.

31 Claims, 3 Drawing Sheets

ULTRA-HEAVY MAIL PIECE PROCESSING SYSTEM

FIELD OF THE INVENTION

This invention relates to mail piece processing and more particularly, to processing mail pieces that have a first page that is a different size than any additional second pages. Even more particularly, the invention relates to processing mail pieces with a first page that is a different size than any additional second pages that exceed a certain number of total pages differently from mail pieces that do not exceed a certain number of total pages.

BACKGROUND OF THE INVENTION

Many businesses, political, and charitable organizations rely on mass mailings to communicate with their constituents or customers. Certain of these mailings, especially those related to billing, may entail large numbers of pages. For example, long-distance telephone service companies and regional telephone companies may produce bills for mailing to their customers that entail numerous pages of detailed information regarding local and long distance phone calls made by the customer. Also, credit card companies which service large accounts, such as corporate accounts, may also generate bills for mailing that have numerous pages detailing various charges on the account. Hospitals may also produce billings to their customers involving numerous pages of detailed billing information.

Producing these bills for mailing on a timely basis is both a necessary and vital business function. In many cases a business's best customers often receive the largest bills. These customers also typically demand their bills to be of a high quality on cleanly cut paper. Once received by the customer, the bills are often copied and distributed within the company. Producing bills for mailing to these customers in a timely fashion and with high quality is difficult to do. Thus, the best customers for a business often get the poorest service in relation to receiving their bills in a timely fashion because of their large number of pages and the high quality that is required.

Many efforts have been made to assist businesses and organizations having these large mass mailings to be able to gather the data, process the data, and print the data in as fast and accurate and economical a manner as possible.

In some businesses that produce these large mass mailings, and particularly related to billing, the first page of the bill is printed on a different size sheet of paper than the subsequent detailed sheets. The first page often has a tear-off stub portion that the customer returns with their payment for the bill. This type of bill format introduces even more problems in efficiently processing, formatting, printing, and mailing out bills to customers. example, there are mail piece handling machines that are designed to work in conjunction with a printer to automatically fold the printed bill, add inserts, stuff the bill and inserts into an envelope, seal the envelope, and apply the proper postage for mailing. However, most of these machines have a limit as to the number of pages they are able to handle. Typical upper limits on such mail piece handling machines range from between eight to ten pages total. Once this upper bound has been exceeded, then a different process must be used to handle the bills. These bills, which have more pages than the automatic processing system can handle, and are referred to as heavy bills. Normally, processing these heavy bills entails some amount of manual labor in order to match the first cover page of one size with the corresponding second pages of a different size, merging the two together for mailing, and then applying the proper postage. Experience has shown that the more second pages there are in a heavy bill, the more inefficient the whole process becomes.

SUMMARY OF THE INVENTION

There is a need in the art to ensure that bills that have a large number of pages are sent to customers on a timely basis through more efficient processing. There is also a need in the art to reduce the amount of manual labor spent in processing bills that have a large number of pages. There is a further need in the art to ensure that bills that have a large number of pages are of a high quality, are printed in less time, and at a reduced cost.

Thus, it is an aspect of the present invention, in mail pieces where the first page of the mail piece is a different size than any second pages of the mail piece, and when the total number of pages in the mail piece is greater than a predetermined upper bound, to process the data stream for the mail piece differently than the data stream for mail pieces that have a total number of pages less than the upper bound.

Yet another aspect of the invention is to split the data stream for a mail piece having total pages greater than a predetermined upper bound into a data stream for the first page and a data stream for the remaining second pages.

Still another aspect of the invention for a mail piece having total pages greater than a predetermined upper bound is to send the data stream for the first page to a printer that will print the first page efficiently, and to send the data stream for the second pages to a different printer that will print the second pages efficiently.

A still further aspect of the invention is to reformat the data stream for the second pages so that the data will be printed correctly on the different printer.

The above and other aspects of the invention are accomplished in an ultra-heavy mail piece processing system that first collects the data to be printed out and then formats the data for printing. A rendering process then determines how the mail piece will be printed. Based on the total number of pages in the mail piece, the system will direct mail pieces having total pages less than or equal to a lower bound to an automated print and mail process. Mail pieces having total pages greater than the lower bound but less than an upper bound are directed to a different print and mail process that requires some manual handling. Mail pieces that have total pages equal to or greater than the upper bound are directed to a third print and mail process.

In this third print and mail process, the data stream, which is the electronic image for each mail piece, is split into a data stream for the first page and a data stream for all the second pages for the mail piece. The initial data formatting is preserved for the data stream for each first page and the data stream for each first page is sent to a printer for printing in a one-up format. The data stream for each set of second pages is reformatted to allow the data stream for each set of second pages to be sent to and printed on a second printer in a two-up format. The second printer prints at a higher speed than the first printer, and utilizes a different post-printing cutting and stacking process. After each of the first pages and each set of second pages are printed, the first pages are manually collated with their corresponding set of second pages forming mail pieces, and each mail piece is then manually packaged up and the proper postage is applied for mailing.

DETAILED DESCRIPTION

Figure 1:
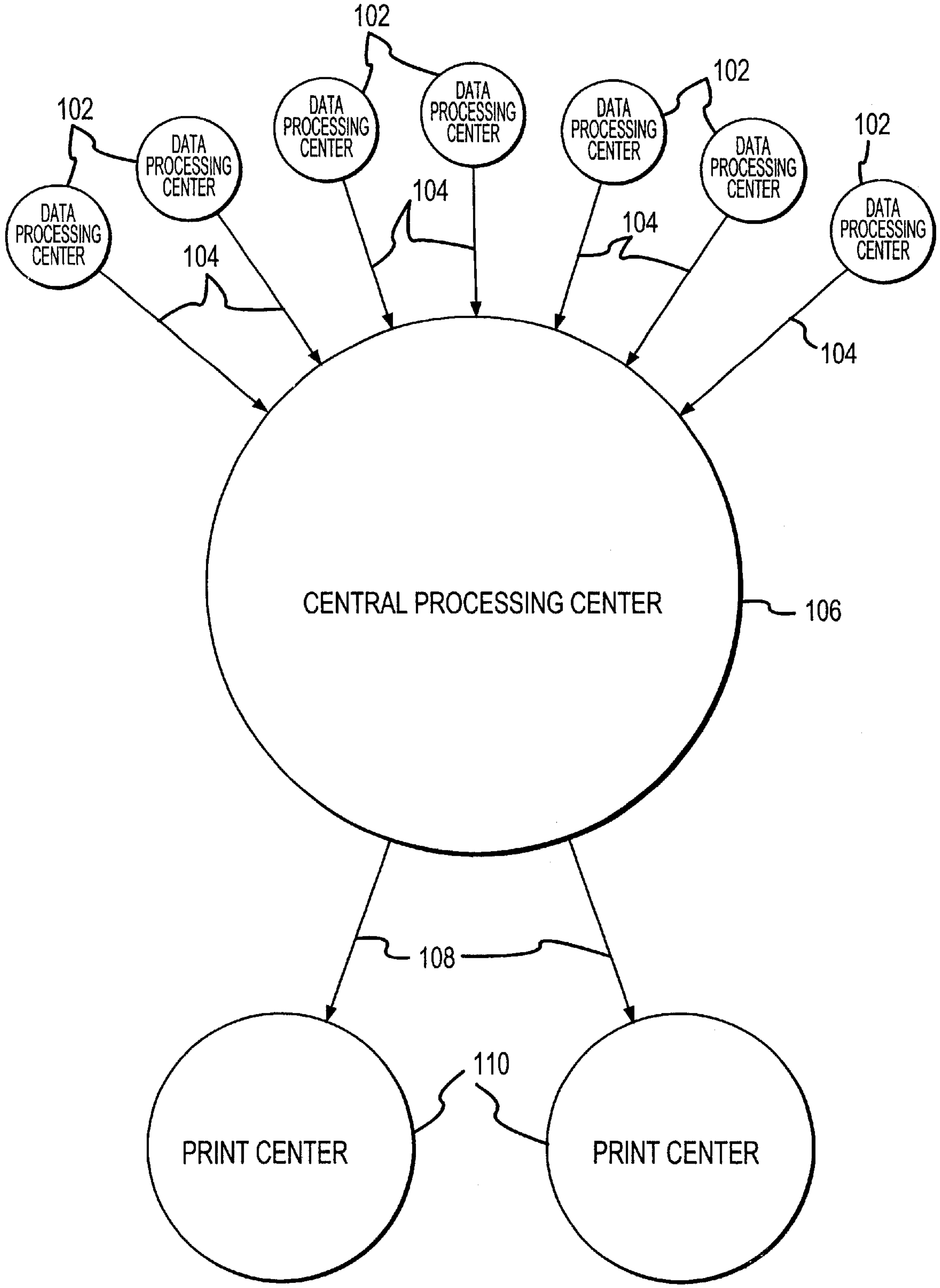
FIG. 1 shows a block diagram of a business environment that employs an embodiment of the ultra-heavy mail piece processing system of the present invention.

FIG. 1 shows a block diagram of a business environment that employs an embodiment of the ultra-heavy mail piece processing system of the present invention. Referring now to FIG. 1, data processing centers 102 gather and collect data to be processed, printed, and mailed to business customers. The data collected may be for goods or services used or consumed by the customer, such as long distance phone charges, credit card charges, hospital charges, etc. Data processing centers 102 may be located in different geographical areas, such as different cities, states, or regions across the country or world. Seven data processing centers 102 are shown if FIG. 1, but one skilled in the art will recognize that there may be more or less data processing centers 102 than those shown in FIG. 1. data processing center 102 may operate on a certain cycle. For example, each data processing center 102 may gather and collect data all day long up until a certain time, say 7:00 p.m. At 7:00 p.m. data collection stops and the data collected is then released for further processing. Or, each data processing center 102 may collect data every day and store the data until a certain day of the week or a certain day of the month, and on that certain day the data collected for the previous week or month is released for further processing.

Each data processing center 102 is connected to central processing center 106 through a communication link 104. Each communication link 104 may be via telephone transmission, microwave transmission, satellite transmission, optical fiber transmission, a combination of any of the above, or any other suitable data transmission means.

Central processing center 106 receives the data from each data processing center 102 and further processes the data and outputs the data to a print queue, as more fully described below in FIG. 2. Central processing center 106 typically houses a main frame computer for processing the data received from each data processing center 102. The print queue is a memory in the main frame computer that holds the output designated for the printers until the printers are ready to receive and process the data.

Central processing center 106 is connected to print centers 110 through a communication link 108. Print centers 110 in the preferred embodiment have identical hardware and settings such that the mail pieces may be printed in either print center 110. Thus, the print load can be balanced between each print center 110. And, should parts of one print center 110 be down for some reason, or there is a shortage of workers at one print center 110, the print jobs can be directed to the other print center 110. Each communication link 108 may also be by way of any of the types of transmission means discussed above.

Two print centers 110 are shown if FIG. 1, but one skilled in the art will recognize that there may be more or less print centers 110 than those shown in FIG. 1. One skilled in the art will also recognize that the functions performed by central processing center 106 could be performed in each of the data processing centers 102, and each of the data processing centers 102 could be directly connected to the print centers 110, thus obviating the need for central processing center 106.

The printer hardware located in the print centers 110 then access, via communication links 108, the print queue in central processing center 106. Each print job pulled off the queue has a name and instructions for the print operator, telling the print operator what kind of paper stock to use and what handling process to use. After printing, the mail piece may be automatically handled and prepared for mailing or handled partly automatically and partly manually to be prepared for mailing, depending upon the size of the mail piece.

Figure 2A:
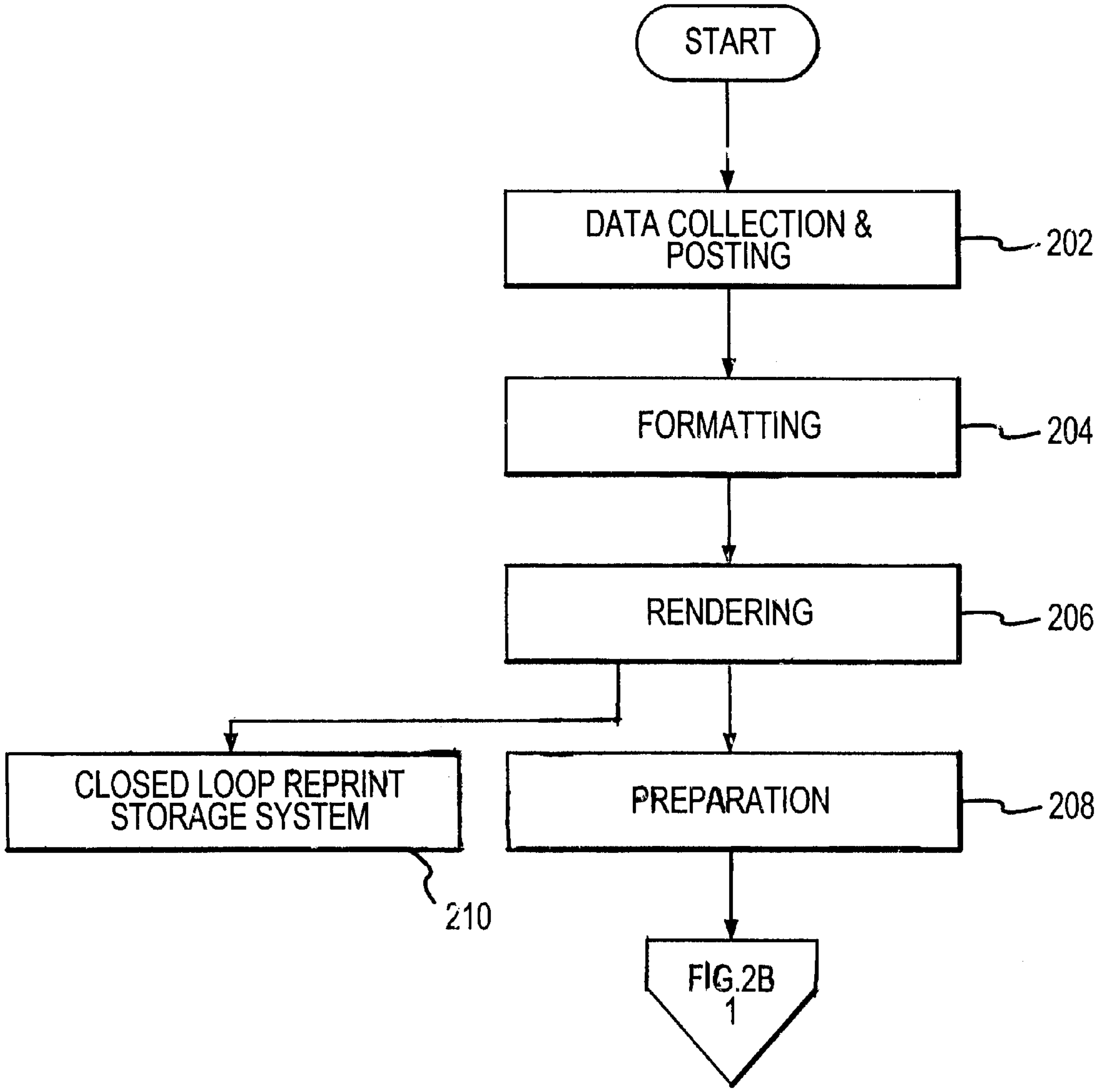
FIGS. 2A and 2B show a flow chart of an embodiment of the ultra-heavy mail piece processing system of the present invention within the business environment shown in FIG. 1.
Figure 2B:
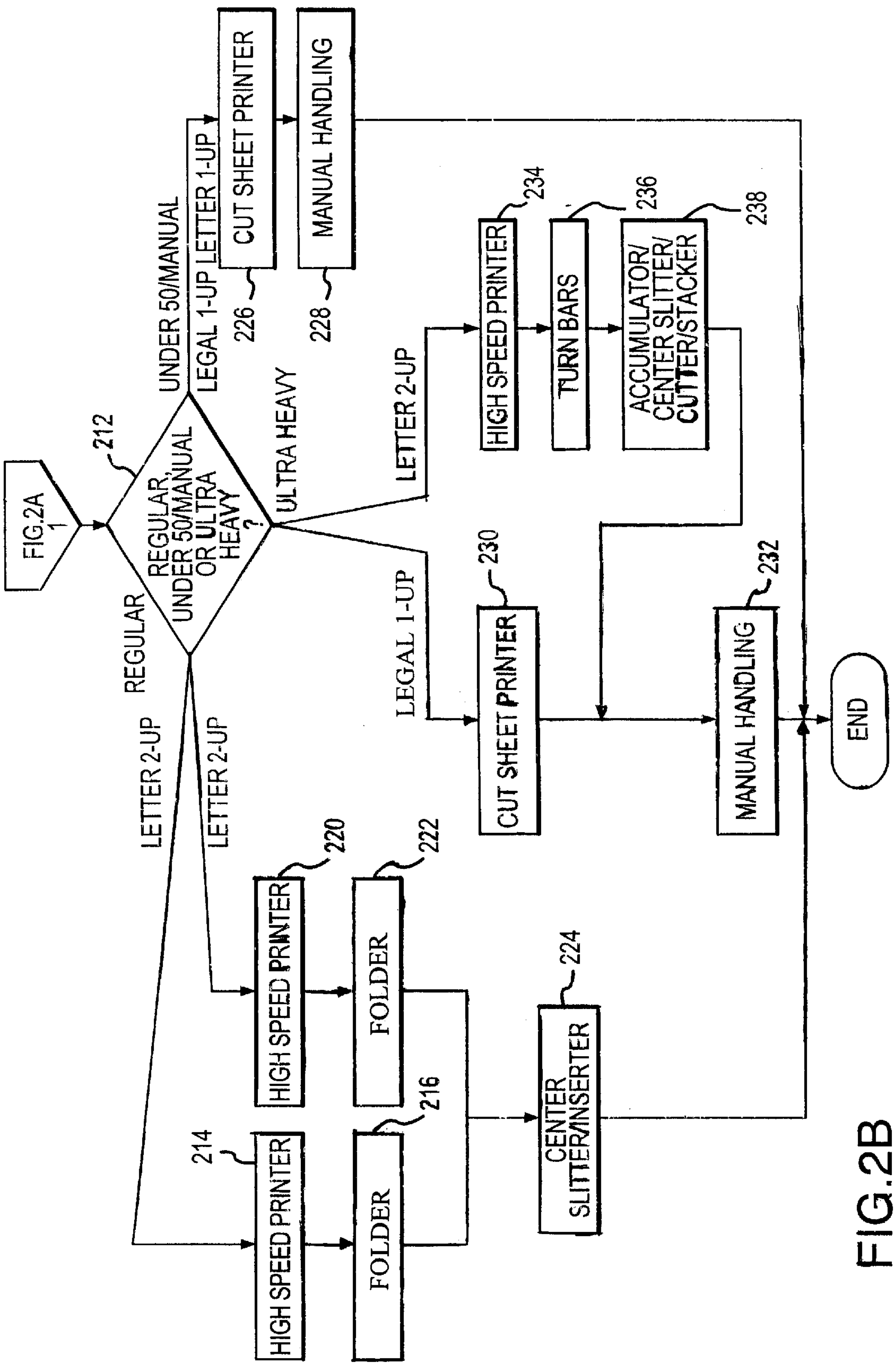

FIGS. 2A and 2B show a flow chart of an embodiment of the ultra-heavy mail piece processing system of the present invention within the business environment shown in FIG. 1. The business environment generates a large number of mail pieces of which a portion have a large number of pages. In order to process all mail pieces efficiently, the ultra-heavy mail piece processing system is incorporated into the overall mail piece generation and processing system. Referring now to FIG. 2A, in step 202, data for the mail pieces are collected and posted as data files. For the business environment shown in FIG. 1, this process would take place in data processing centers 102. In step 204, the data files are then formatted for printing. This step would also be performed in data processing centers 102. In this formatting step 204, each data file for a mail piece is given an instruction set specifying, for example, the font, the positions of the data on the paper, the number of pages, the language to print the bill in, etc. In this embodiment of the invention, all data files are initially formatted for one-up printing. One-up printing means that the data will be printed on either cut sheet paper or continuous form paper that is only one page wide.

In rendering step 206, the data files generated in formatting step 204 are evaluated, and in this embodiment of the invention, the instruction set given for the data files in formatting step 204 are converted to Advanced Function Presentation (AFP) protocol. AFP is a print command language from IBM. AFP is implemented on various platforms by Print Services Facility (PSF) software which generates the native IBM printer language. The printers described below are AFP compatible printers—that is, printers that natively accept the AFP print command language. One skilled in the art will recognize that other print command languages could also be used with the appropriate printers.

Step 206 takes place within the main frame computer in central processing center 106 (FIG. 1). Rendering step 206 also determines where each data file will go in the print centers 110 (FIG. 1). Rendering step 206 divides the data files up based on several criteria, including the type of paper stock the data file needs to be printed on, the different accounts and postal classifications such as carrier route, five digit and three digit zip codes, the number of pages in the data file, any exception coding, foreign language bills, etc.) Based on these criteria, rendering step 206 groups the data files for processing into one of three handling processes: a regular handling process, an under 50/manual handling process, or an ultra-heavy handling process.

The regular handling process handles multiple data files in different postal classes that are between one and eight pages in size. In this embodiment of the invention, due to the limitations of the mail piece handling equipment used, only bills with eight pages or less can be handled, which includes a first page of legal size paper and second through eighth pages, if any, of letter size paper. This regular handling process is totally automatic and requires no manual handling as further described below. Eight total pages of paper is thus the lower bound for this embodiment of the invention. One skilled in the art will recognize that utilizing different mail piece handling equipment that can handle more or less than eight total pages would increase or decrease the lower bound. This regular handling process employs the closed loop mail piece processing method disclosed in U.S. Pat. No. 5,745,590, issued to Pollard, and is hereby incorporated by reference for all that is taught and disclosed therein.

The under 50/manual handling process handles two types of files. Under 50 refers to small files that contain less than 50 bills. These small files, even though they may contain bills that have between one to eight pages, require more time to set them up for the regular handling process than it takes to actually print the mail piece and manually handle it for mailing. For these types of files it is more economical to avoid the automatic regular handling process and fold, stuff, and apply postage for mailing the mail piece manually.

A manual is a group of files that have bills with at least nine total pages and up to 100 total pages, referred to as heavy bills. These heavy bills cannot be processed using the regular handling process. In this embodiment of the invention the heavy bills require some manual handling in order to mail them out, as described below.

The ultra-heavy handling process in this embodiment of the invention handles mail pieces having 101 or more total pages. The upper bound for this embodiment of the invention is thus 100 total pages of paper. However, this upper bound may be adjusted upwards or downwards. The decision to adjust the upper bound number is made outside of the billing process, usually at the beginning of a new work week. An evaluation is done of the anticipated print loads in each print center 110 and the status of the labor work force at each print center 110 for the coming week. Based on this evaluation, the upper bound number may be adjusted, affecting the data processed after the change has been made.

For example, if the under 50/manual handling process is expected to experience a light production load and the ultra-heavy handling process is expected to be taxed, adjusting the upper bound upward to say 110 pages will shift more print work to the under 50/manual handling process and away from the ultra-heavy handling process. Or, if the ultra-heavy handling process is expected to experience a light production load and the under 50/manual process is expected to be taxed, adjusting the upper bound downward to say 90 pages will shift more print work to the ultra-heavy handling process and away from the under 50/manual handling process.

Ultra-heavy mail pieces in this embodiment of the invention also require some manual handling in order to mail the piece out, as described below. By utilizing this ultra-heavy handling process for ultra-heavy mail pieces instead of the under 50/manual handling process, a reduction in total production costs may be achieved. In addition, a two to three day turn around for mailing out ultra-heavy bills is reduced to less than 24 hours.

The resulting modified data files containing AFP data streams of rendering step 206 are transmitted to preparation step 208 and also to closed loop reprint storage system step 210. Closed loop reprint storage system 210 utilizes the document storage and reproduction method that is disclosed in U.S. Pat. No. 5,893,129, also issued to Pollard, which is hereby incorporated by reference for all that is taught and disclosed therein. For the business environment shown in FIG. 1, preparation step 208 and closed loop reprint storage system step 210 take place within the main frame computer in central processing center 106.

Preparation step 208 receives the data files containing AFP data streams generated from rendering step 206. For AFP data streams marked for the regular handling process in step 206, preparation step 208 splits the AFP data streams for all of the mail pieces into an AFP data stream for each of the first pages of each mail piece and an AFP data stream for each of the sets of second pages corresponding to each first page of a mail piece for each mail piece. Preparation step 208 also reformats the AFP data stream for the first pages from legal size one-up to legal size two-up, and reformats the AFP data stream for the second pages from letter size one-up to letter size two-up. Two-up printing involves paper stock that allows for two pages to be printed across the width of the paper.

For AFP data streams marked for the under 50/manual handling process in step 206, preparation step 208 passes the AFP data streams through as the one-up process, but strips off the mechanical identifiers that are no longer needed. These identifiers, such as bar codes, are utilized by the mail piece handling equipment of the regular handling process.

For AFP data streams marked for the ultra-heavy handling process in step 206, preparation step 208 splits the AFP data streams for all of the mail pieces into an AFP data stream for each of the first pages of each mail piece and an AFP data stream for each of the sets of second pages corresponding to each first page of a mail piece for each mail piece. The AFP data streams for each of the sets of second pages are reformatted from letter size one-up printing to letter size two-up printing. After processing preparation step 208, all the resulting AFP data streams are placed in the print queue.

Referring now to FIG. 2B, in step 212 the printer hardware located in either print centers 110 (FIG. 1) access the AFP data streams held in the print queue. If the current portion of the AFP data stream accessed is marked for the regular handling process as determined in step 206, then step 212 directs the first page AFP data stream formatted for legal size two-up printing to step 214, and directs the second page AFP data stream formatted for letter size two-up printing to step 220.

In step 214, the AFP data stream is printed out on a high speed printer that utilizes paper stock that is continuous form and may be preprinted in color or black and white, and may divide each page into halves or quadrants of different sizes, and provide boxes where the data will be printed. The forms may layout in portrait or landscape position depending upon the bill type. The paper stock is 17 inches wide and is wound on rolls which feed the paper stock into the high speed printers. The paper stock is normally perforated between pages. In this embodiment of the invention, the duplex wide high speed printer is an IBM 3900, which is an AFP compatible printer. However, any other AFP compatible duplex wide high speed printers could also be used.

In step 214, the legal size first pages are printed two-up front and back on the duplex wide high speed printer. The paper stock utilized is legal size two-up continuous form, which is also on a roll that feeds into the duplex wide high speed printer.

The AFP data stream for the second pages formatted for letter size two-up printing in preparation step 208 are printed on a second high speed printer in step 220. The paper stock utilized is letter size two-up continuous form, which is also on a roll that feeds into the second duplex wide high speed printer. One skilled in the art will recognize that the same duplex wide high speed printer could be used to print the first pages and the second pages by changing the paper feed between the printing of each AFP data stream. In the preferred embodiment of the invention, two duplex wide high speed printers are used to increase the production volume.

In steps 216 and 222, the legal size two-up pages printed in step 214 and the letter size two-up pages printed in step

220 respectively exit the duplex wide high speed printers, and are then fed to a folder which fan-folds the pages along a perforation between each set of two-up pages and stacked. Folders manufactured by Stralfors or Role Systems, or any other suitable manufacturer, may be utilized in steps 216 and 222.

In step 224, the fan-folded stack of two-up legal size pages and the fan-folded stack of two-up letter size pages are passed through a center slitter/inserter combination machine, such as made by Pitney Bowes, or any other suitable mailing equipment manufacturer. The fan-folded stack of two-up legal size pages are fed into one input bin having a center slitter which separates each set of two-up legal size pages per fold into two separate legal size pages. The fan-folded stack of two-up letter size pages are fed into another input bin also having a center slitter which separates each set of two-up letter size pages per fold into two separate letter size pages. The resulting two continuous forms of legal size pages and the resulting two continuous forms of letter size pages are fed into the inserter. The inserter separates the pages along the perforation between pages, trims the edges of the pages, merges the legal size first page with the proper set of second pages which are in proper order, folds the resulting mail piece, stuffs the mail piece into an envelope, seals the envelope, and applies the proper postage to the envelope for mailing. The regular handling process then ends.

If in step 212, when the printer hardware located in either print centers 110 (FIG. 1) access the AFP data streams held in the print queue, if the current portion of the AFP data stream accessed is an under 50/manual handling process as determined in step 206, then step 212 directs that AFP data stream to step 226. In step 226 the AFP data stream is printed out on a duplex cut sheet printer, which operates at a slower speed than the duplex wide high speed printers. The first pages are formatted on legal size paper for one-up printing and the second pages are formatted for letter size paper for one-up printing. The duplex cut sheet printer has two paper input bins. One bin holds legal size paper, and the other bin holds letter size paper. In this embodiment of the invention, the duplex cut sheet printer is an IBM 3160, which is an AFP compatible printer. However, any other AFP compatible duplex cut sheet printer could also be used.

The legal size page for a mail piece is printed first and then all of the letter size pages are printed last in a collated manner, such that as the pages are output from the printer, they are stacked with the legal page, which is the first page of the bill, face down on the bottom of the stack, and the second pages in the proper order stacked on top. In step 228, the stacked pages for each mail piece are manually handled. The mail pieces are separated from each other, folded if applicable, placed in an appropriate size envelope or box, sealed, and then the proper amount of postage is applied. After each mail piece is thus processed, the under 50/manual handling process ends.

If in step 212, when the printer hardware located in either print centers 110 (FIG. 1) access the AFL data streams held in the print queue, if the current portion of the AFP data stream accessed is an ultra-heavy handling process as determined in step 206, then step 212 directs the first page AFP data stream formatted for legal size one-up printing to step 230, and directs the second page AFP data stream formatted for letter size two-up printing to step 234.

In step 230, the AFP data stream formatted for legal size one-up printing is printed out on a duplex cut sheet, printer. This duplex cut sheet printer may be the same duplex cut sheet printer used in step 226, or a different duplex cut sheet printer. In the preferred embodiment of the invention, the same duplex cut sheet printer is used in step 226 and step 230 to enable greater efficient use of the same equipment. The legal size pages are automatically stacked upon exiting the duplex cut sheet printer.

In step 234, the AFP data streams formatted for letter size two-up printing are printed out on a duplex wide high speed printer, which utilizes paper stock that allows for the letter size two-up printing. The duplex wide high speed printer used in step 234 may be one of the duplex wide high speed printers used in step 214 or step 220, or may be an additional duplex wide high speed printer. In the preferred embodiment of the invention, the duplex wide high speed printer in step 234 is one of the duplex wide high speed printers used in step 214 or step 220. This allows for greater efficient use of the same equipment to handle the different handling processes.

The output from the duplex wide high speed printer in step 234 is directed to a series of turn bars in step 236. The turn bars basically turn the paper 90 degrees from the direction coming out of the duplex wide high speed printer, directing the paper away from the folder of step 216 or step 222, and to an accumulator/center slitter/cutter/stacker combination machine. The duplex wide high speed printer may print the continuous form paper faster than the rest of the remaining processes can handle.

Therefore, in step 238, the accumulator portion of the combination machine catches the continuous form paper as it exits the duplex wide high speed printer and passes through the turn bars, and holds it for further processing. The duplex wide high speed printer and the accumulator/center slitter/cutter/stacker combination machine are electronically connected and monitored to control the flow of paper.

Further in step 238, the continuous form paper is fed from the accumulator to a center slitter portion of the combination machine which cuts the two-up paper down the middle, creating a left stream of one-up paper and a right stream of one-up paper. The left stream of one-Up paper and the right stream of one-up paper are then directed to a cutter/stacker portion of the combination machine, which cuts each page and stacks them. In step 232 the cut and stacked pages from step 238 are manually merged with the output from step 230, which is the legal size first pages. The merged first page and corresponding second pages forming a mail piece are then manually placed inside a box, package, or envelope, the box, package, or envelope is sealed and weighed, and then the proper amount of postage is applied. After each mail piece is thus processed, the ultra-heavy handling process ends.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for mail piece processing, each mail piece having a first page a different size from any second pages which are all the same size, said method comprising the steps of:

(a) evaluating at least one mail piece data stream formatted for one-up printing, wherein said at least one mail piece data stream is an electronic image of at least one mail piece;

(b) determining a total number of pages for said at least one mail piece data stream formatted for one-up printing;

(c) if said total number of pages is greater than a predetermined upper bound number, (c1) splitting said at least one mail piece data stream formatted for one-up printing into a first page data stream formatted for one-up printing and a second pages data stream formatted for one-up printing;

(c2) reformatting said second pages data stream formatted for one-up printing to two-up printing;

(c3) sending said first page data stream for one-up printing to a first printer; and (c4) sending said second pages data stream reformatted for two-up printing to a second printer.

2. The method according to claim, 1 further comprising the steps (a0a) through (a0c) performed before step (a):

(a0a) collecting data for said at least one mail piece;

(a0b) posting said data for said at least one mail piece as said at least one mail piece data stream contained in a mail piece data file; and (a0c) formatting said at least one mail piece data stream in said mail piece data file for one-up printing.

3. The method according to claim 1 wherein step (c3) further comprises the steps (c3a) and (c3b):

(c3a) processing said first page data stream for one-up printing in said first printer, wherein said first printer is a duplex cut sheet printer; and (c3b) printing out said processed first page data stream for one-up printing onto a legal size cut sheet paper.

4. The method according to claim 3 wherein step (c4) further comprises the steps (c4a) through (c4g):

(c4a) processing said second pages data stream reformatted for two-up printing in said second printer, wherein said second printer is a duplex wide high speed printer;

(c4b) printing out said processed second pages data stream reformatted for two-up printing onto a letter size two-up continuous form paper;

(c4c) directing said letter size two-up continuous form paper from said duplex wide high speed printer through a series of turn bars to an accumulator;

(c4d) directing said letter size two-up continuous form paper from said accumulator to a center slitter;

(c4e) cutting said letter size two-up continuous form paper with said center slitter forming a left stream of one-up paper and a right stream of one-up paper;

(c4f) directing said left stream of one-up paper and said right stream of one-up paper to a cutter/stacker;

(c4g) cutting said left stream of one-up paper and cutting said right stream of one-up paper into a plurality of letter size sheets; and (c4h) stacking said plurality of letter size sheets.

5. The method according to claim 4 further comprising the steps of:

(c4i) merging said legal size cut sheet paper with said plurality of letter size sheets forming said at least one mail piece;

(c4j) packaging said at least one mail piece;

(c4k) sealing said at least one mail piece;

(c4l) weighing said at least one mail piece; and (c4m) applying postage to said at least one mail piece.

6. The method according to claim 5 wherein steps (a) through (c4m) are repeated for a plurality of mail piece data streams formatted for one-up printing.

7. The method according to claim 1 further comprising the steps (a0a) and (a0b) performed before step (a):

(a0a) evaluating an anticipated print load and an anticipated labor work force associated with the mail piece processing method; and (a0b) adjusting said predetermined upper bound number based on the results of step (a0a).

8. The method according to claim 1 further comprising the steps of:

(d) if said total number of pages is less than or equal to said predetermined upper bound number and greater than a predetermined lower bound number, (d1) sending said at least one mail piece data stream formatted for one-up printing to a third printer;

(d2) processing said at least one mail piece data stream formatted for one-up printing in said third printer;

(d3) printing out a first page of the mail piece on a legal size cut sheet paper with said third printer;

(d4) stacking said first page of the mail piece printed on said legal size cut sheet paper;

(d5) printing out at least one second page of the mail piece on a letter size cut sheet paper with said third printer;

(d6) stacking said at least one second page of the mail piece printed on said letter size cut sheet paper onto said first page of the mail piece, forming said at least one mail piece;

(d7) packaging said at least one mail piece;

(d8) sealing said at least one mail piece;

(d9) weighing said at least one mail piece; and (d10) applying postage to said at least one mail piece.

9. The method according to claim 8 wherein said third printer is said first printer.

10. The method according to claim 8 further comprising the steps of:

(e) if said total number of pages is less than or equal to said predetermined lower bound number, (e1) splitting said at least one mail piece data stream formatted for one-up printing into a first page data stream formatted for one-up printing and a second pages data stream formatted for one-up printing;

(e2) reformatting said first page data stream formatted for one-up printing to two-up printing;

(e3) reformatting said second pages data stream formatted for one-up printing to two-up printing;

(e4) sending said first page data stream reformatted for two-up printing to a fourth printer;

(e5) sending said second pages data stream reformatted for two-up printing to a fifth printer;

(e6) processing said first page data stream reformatted for two-up printing in said fourth printer;

(e7) printing out a first page of the mail piece on a legal size two-up continuous form paper with said fourth printer;

(e8) folding said first page of the mail piece printed on said legal size two-up continuous form paper;

(e9) processing said second pages data stream reformatted for two-up printing in said fifth printer;

(e10) printing out at least one second page of the mail piece on a letter size two-up continuous form paper with said fifth printer;

(e11) folding said at least one second page of the mail piece printed on said letter size two-up continuous form paper; and (e12) feeding said first page of the mail piece printed on said legal size two-up continuous form paper and feeding said at least one second page of the mail piece printed on said letter size two-up continuous form paper to a mail piece handling machine forming said at least one mail piece, wherein said mail piece handling machine automatically packages, seals, weighs, and applies postage to said at least one mail piece.

11. The method according to claim 10 wherein said fourth printer is said second printer.

12. The method according to claim 10 wherein said fifth printer is said second printer.

13. A method for mail piece processing, each mail piece having a first page a different size from any second pages which are all the same size, said method comprising the steps of:

(a) collecting data for a plurality of mail pieces;

(b) posting said data for said plurality of mail pieces in a plurality of mail piece data files containing a plurality of mail piece data streams;

(c) formatting said plurality of mail piece data streams in said plurality of mail piece data files for one-up printing;

(d) evaluating said plurality of mail piece data streams formatted for one-up printing;

(e) determining a total number of pages for each of the mail pieces in said plurality of mail piece data streams formatted for one-up printing;

(f) processing in a first handling process each of said plurality of mail piece data streams formatted for one-up printing whose said total number of pages is greater than a predetermined upper bound number;

(g) processing in a second handling process each of said plurality of mail piece data streams formatted for one-up printing whose said total number of pages is less than or equal to said predetermined upper bound number and greater than a predetermined lower bound number; and (h) processing in a third handling process each of said plurality of mail piece data streams formatted for one-up printing whose said total number of pages is less than or equal to said predetermined lower bound number.

14. The method according to claim 13 wherein step (f) further comprises the steps (f1) through (f4):

(f1) splitting each of said plurality of mail piece data streams formatted for one-up printing into a plurality of first page data streams formatted for one-up printing and a plurality of second pages data streams formatted for one-up printing;

(f2) reformatting said plurality of second pages data streams formatted for one-up printing to two-up printing;

(f3) sending said plurality of first page data streams formatted for one-up printing to a first printer; and (f4) sending said plurality of second pages data streams reformatted for two-up printing to a second printer.

15. The method according to claim 14 wherein step (f3) further comprises the steps (f3a) and (f3b):

(f3a) processing said plurality of first page data streams formatted for one-up printing in said first printer, wherein said first printer is a duplex cut sheet printer; and (f3b) printing out said processed plurality of first page data streams formatted for one-up printing onto a plurality of legal size cut sheet papers.

16. The method according to claim 15 wherein step (f4) further comprises the steps (f4a) through (f4m):

(f4a) processing said plurality of second pages data streams reformatted for two-up printing in said second printer, wherein said second printer is a duplex wide high speed printer;

(f4b) printing out said processed plurality of second pages data streams reformatted for two-up printing onto a letter size two-up continuous form paper;

(f4c) directing said letter size two-up continuous form paper from said duplex wide high speed printer through a series of turn bars to an accumulator;

(f4d) directing said letter size two-up continuous form paper from said accumulator to a center slitter;

(f4e) cutting said letter size two-up continuous form paper with said center slitter forming a left stream of one-up paper and a right stream of one-up paper;

(f4f) directing said left stream of one-up paper and said right stream of one-up paper to a cutter/stacker;

(f4g) cutting said left stream of one-up paper and cutting said right stream of one-up paper into a plurality of letter size sheets;

(f4h) stacking said plurality of letter size sheets;

(f4i) merging said plurality of legal size cut sheet papers with said plurality of letter size sheets forming said plurality of mail pieces;

(f4j) packaging each of said plurality of mail pieces;

(f4k) sealing each of said plurality of mail pieces;

(f4l) weighing each of said plurality of mail pieces; and (f4m) applying postage to each of said plurality of mail pieces.

17. The method according to claim 13 further comprising the steps (a0a) and (a0b) performed before step (a0a) evaluating an anticipated print load and an anticipated labor work force associated with the mail piece processing method; and (a0b) adjusting said predetermined upper bound number based on the results of step (a0a).

18. The method according to claim 13 wherein step (g) further comprises the steps (g1) through (g11):

(g1) sending each of said plurality of mail piece data streams formatted for one-up printing to a third printer;

(g2) processing each of said plurality of mail piece data streams formatted for one-up printing in said third printer;

(g3) printing out a first first page of a first mail piece of said plurality of mail pieces on a legal size cut sheet paper with said third printer;

(g4) stacking said first first page of said first mail piece printed on said legal size cut sheet paper;

(g5) printing out a first set of second pages of said first mail piece of said plurality of mail pieces on a plurality of letter size cut sheet papers with said third printer;

(g6) stacking said first set of second pages of said first mail piece printed on said plurality of letter size cut sheet papers onto said first first page of said first mail piece, forming said first mail piece;

(g7) packaging said first mail piece;

(g8) sealing said first mail piece;

(g9) weighing said first mail piece;

(g10) applying postage to said first mail piece; and (g11) repeating steps (g3) through (g10) for each remaining said plurality of mail piece data streams formatted for one-up printing for all remaining said plurality of mail pieces.

19. The method according to claim 18 wherein said third printer is said first printer.

20. The method according to claim 18 wherein step (h) further comprises the steps (h1) through (h12):

(h1) splitting each of said plurality of mail piece data streams formatted for one-up printing into a plurality of first page data streams formatted for one-up printing and a plurality of second pages data streams formatted for one-up printing;

(h2) reformatting said plurality of first page data streams formatted for one-up printing to two-up printing;

(h3) reformatting said plurality of second pages data streams formatted for one-up printing to two-up printing;

(h4) sending said plurality of first page data streams reformatted for two-up printing to a fourth printer;

(h5) sending said plurality of second pages data streams reformatted for two-up printing to a fifth printer;

(h6) processing said plurality of first page data streams reformatted for two-up printing in said fourth printer;

(h7) printing out a plurality of first pages of said plurality of mail pieces on a legal size two-up continuous form paper with said fourth printer;

(h8) folding said plurality of first pages of said plurality of mail pieces printed on said legal size two-up continuous form paper;

(h9) processing said plurality of second pages data streams reformatted for two-up printing in said fifth printer;

(h10) printing out a plurality of sets of second pages of said plurality of mail pieces on a letter size two-up continuous form paper with said fifth printer;

(h11) folding said plurality of sets of second pages of said plurality of mail pieces printed on said letter size two-up continuous form paper; and (h12) feeding said plurality of first pages of said plurality of mail pieces printed on said legal size two-up continuous form paper and feeding said plurality of sets of second pages of said plurality of mail pieces printed on said letter size two-up continuous form paper to a mail piece handling machine forming said plurality of mail pieces, wherein said mail piece handling machine automatically packages, seals, weighs, and applies postage to said plurality of mail pieces.

21. The method according to claim 20 wherein said fourth printer is said second printer.

22. The method according to claim 20 wherein said fifth printer is said second printer.

23. An apparatus for mail piece processing, each mail piece having a first page a different size from any second pages which are all the same size, said apparatus comprising:

a central processing computer having a processor for processing at least one mail piece data stream formatted for one-up printing, and for determining a total number of pages for said at least one mail piece data stream formatted for one-up printing, and for splitting said at least one mail piece data stream formatted for one-up printing into a first page data stream for one-up printing and a second pages data stream for one-up printing if said total number of pages is greater than a predetermined upper bound number, and for reformatting said second pages data stream for one-up printing to two-up printing;

a first printer for processing said first page data stream for one-up printing; and a second printer for processing said second pages data stream reformatted for two-up printing.

24. The apparatus according to claim 23 further comprising:

at least one data processing computer in communication with said central processing computer for collecting data for at least one mail piece, and for posting said data for said at least one mail piece as said at least one mail piece data stream in a mail piece data file, and for formatting said at least one mail piece data stream in said mail piece data file for one-up printing.

25. The apparatus according to claim 23 wherein said first printer is a duplex cut sheet printer that prints out said first sheet data stream for one-up printing onto a legal size cut sheet paper.

26. The apparatus according to claim 23 wherein said second printer is a duplex wide high speed printer that prints out said second sheet data stream reformatted for two-up printing onto a letter size two-up continuous form paper.

27. The apparatus according to claim 26 further comprising:

a series of turn bars for altering the path of said letter size two-up continuous form paper as said letter size two-up continuous form paper exits said duplex wide high speed printer.

28. The apparatus according to claim 27 further comprising:

an accumulator for catching said letter size two-up continuous form paper as said letter size two-up continuous form paper exits from said series of turn bars.

29. The apparatus according to claim 28 further comprising:

a center slitter for cutting said letter size two-up continuous form paper received from said accumulator, forming a left stream of one-up paper and a right stream of one-up paper.

30. The apparatus according to claim 29 further comprising:

a cutter/stacker for cutting said left stream of one-up paper received from said center slitter and for cutting said right stream of one-up paper received from said center slitter into a plurality of letter size sheets, and for stacking said plurality of letter size sheets.

31. The apparatus according to claim 30 wherein said accumulator, said center slitter, and said cutter/stacker form a combination machine.

* * * * *

UNITED STATES PATENT AND TRADEMARK OFFICE

CERTIFICATE OF CORRECTION

PATENT NO. : 6,496,810 B1

DATED : December 17, 2002

INVENTOR(S) : Pollard et al.

It is certified that error appears in the above-identified patent and that said Letters Patent is hereby corrected as shown below:

<u>Column 12,</u>
Line 33, after the word “step”, insert -- (a): --
Line 33, begin the second occurrence of “(a0a)” on a new line.

Signed and Sealed this

Twenty-second Day of April, 2003

JAMES E. ROGAN
*Director of the United States Patent and Trademark Office*